(12) United States Patent
Chebbo et al.

(10) Patent No.: US 8,825,120 B2
(45) Date of Patent: Sep. 2, 2014

(54) SHORT RANGE WIRELESS NETWORKS

(75) Inventors: Hind Chebbo, Cowley (GB); Saied Abedi, Reading (GB)

(73) Assignee: Fujitsu Limited, Kawasaki (JP)

( * ) Notice: Subject to any disclaimer, the term of this patent is extended or adjusted under 35 U.S.C. 154(b) by 237 days.

(21) Appl. No.: 13/254,068

(22) PCT Filed: Feb. 9, 2010

(86) PCT No.: PCT/EP2010/051593
§ 371 (c)(1),
(2), (4) Date: Nov. 18, 2011

(87) PCT Pub. No.: WO2010/100013
PCT Pub. Date: Sep. 10, 2010

(65) Prior Publication Data
US 2012/0071098 A1 Mar. 22, 2012

(30) Foreign Application Priority Data
Mar. 4, 2009 (EP) .................................. 09154362

(51) Int. Cl.
*H04M 1/00* (2006.01)
*H04B 1/38* (2006.01)

(52) U.S. Cl.
USPC .......................... 455/574; 455/458; 455/66.1

(58) Field of Classification Search
USPC ....................... 455/41.2, 41.3, 66.1, 574, 458
See application file for complete search history.

(56) References Cited

U.S. PATENT DOCUMENTS

2004/0230638 A1 * 11/2004 Balachandran et al. ...... 709/200
2005/0141547 A1   6/2005 Cho et al.
2006/0002383 A1   1/2006 Jeong et al.
2006/0031378 A1   2/2006 Vallapureddy et al.
2006/0092907 A1   5/2006 Shimokawa et al.
2008/0291855 A1  11/2008 Bata et al.

FOREIGN PATENT DOCUMENTS

| EP | 1473870 A2 | 3/2004 |
| EP | 1 473 870 | 11/2004 |
| JP | 2005-198307 | 7/2005 |
| JP | 2006-319444 | 11/2006 |
| JP | 2007-67829 | 3/2007 |
| JP | 2008-503990 | 2/2008 |
| WO | 2007/083586 | 7/2007 |

OTHER PUBLICATIONS

Japanese Office Action mailed Aug. 13, 2013 in corresponding Japanese Application No. 2011-552377.
Kyung Sup Kwak et al., "Traffic-based Wake-up Mechanisms for WBAN", Doc: IEEE 802.15/09/0040-00/0006, Jan. 2009, pp. 1-14.
Korean Office Action mailed Feb. 22, 2013 for corresponding Korean Application No. 10-2011-7023341.
IEEE 802.15.4-2006 Standard, Sep. 8, 2003.
IEEE 802.15.3-2003 Standard, Sep. 29, 2003.
IEEE 802.15.6 Standard, Jun. 2011.
European Search Report issued Oct. 6, 2009 in European Application No. 091543662.9-1249.
International Search Report issued May 7, 2010 in PCT/EP2010/051593.

* cited by examiner

*Primary Examiner* — Lewis West
(74) *Attorney, Agent, or Firm* — Staas & Halsey LLP

(57) ABSTRACT

A sensor for use in a wireless sensor network of devices, comprising:
sensing means operable to detect values of a parameter;
control means operable to determine a suitable sleep pattern of the sensor taking into account the detected values and
a transmitter operable to transmit an indication of the suitable sleep pattern to a further device in the wireless sensor network.

10 Claims, 15 Drawing Sheets

Architecture

| Battery | | Sleep Pattern | | | |
|---|---|---|---|---|---|
| bits:b1b2 | Levels | Low Wakeup | Medium Wakeup | High Wakeup | Continuous Wakeup |
| 00 | L1=0%-25% | ✓ | ✗ | ✗ | ✗ |
| 01 | L2=25%-50% | ✓ | ✓ | ✗ | ✗ |
| 10 | L3=50%-75% | ✓ | ✓ | ✓ | ✗ |
| 11 | L4=75%-100% | ✓ | ✓ | ✓ | ✓ |

| Bits:0-2 | 3 | 4 | 5 | 6 | 7-9 | 10-11 | 12-13 | 14-15 | Extended bit:0 | Extended bits:1 |
|---|---|---|---|---|---|---|---|---|---|---|
| Frame Type | Security Enabled | Frame Pending | ACK Request | PAN ID Compression | Reserved | Destination Addressing Mode | Frame Version | Source Addressing Mode | Urgent1 | Urgent2 |
|  |  |  |  |  |  |  |  |  | 81 | 82 |

| Bits:0-2 | 3 | 4 | 5 | 6 | 7-9 | 10-11 | 12-13 | 14-15 | Extended bit:0 | Extended bits:1 | Extended bit:2 | Extended bits:3 |
|---|---|---|---|---|---|---|---|---|---|---|---|---|
| Frame Type | Security Enabled | Frame Pending | ACK Request | PAN ID Compression | Reserved | Destination Addressing Mode | Frame Version | Source Addressing Mode | Urgent1 | Urgent2 | Battery Level 1 | Battery Level 2 |

| Bits: 0-2 | 3 | 4 | 5 | 6 | 7 | 8-9 | 10-11 | 12-13 | 14-15 | Extended bit:0 | Extended bits:1 | Extended bit:2 | Extended bits:3 |
|---|---|---|---|---|---|---|---|---|---|---|---|---|---|
| Frame Type | Security Enabled | Frame Pending | ACK Request | PAN ID Compression | Emergency | ACK Types | Destination Addressing Mode | Frame Version | Source Addressing Mode | Urgent 1 | Urgent 2 | Battery Level 1 | Battery Level 2 |

| Frame Type Value b2 b1 b0 | Description |
|---|---|
| 000 | Beacon frame |
| 001 | Data frame |
| 010 | ACK |
| 011 | MAC command |
| 100 | Immediate Ack |
| 101- | Delayed Ack |
| 111 | Emergency |

FIG. 24

| Frame Type Value (3bits) | Description |
|---|---|
| 000 | Beacon frame |
| 001 | Data frame |
| 010 | ACK |
| 011 | MAC command |
| 100 | Immediate Ack |
| 101- | Delayed Ack |
| 111 | Emergency |

FIG. 23

| Frame header | | | | | |
|---|---|---|---|---|---|
| Frame control | | | | | ...... |
| Frame Type (3bits) | ACK Policy (two bits) | Emergency (1 bit) | Urgency levels (two bits) | Battery Levels (two bits) | ...... |

| Octets | 1 | (see 7.2.2.4.1) | 0/5/6/10/14 | 1 | Variable | 2 |
|---|---|---|---|---|---|---|
| Frame control | Sequence Number | Addressing fields | Auxiliary Security Header | Command Frame Identifier | Command Payload | FCS |
| MHR | | | | MAC Payload | | MFR |

FIG. 25

| Command frame identifier | Command name | RFD Tx | RFD Rx | Subclause |
|---|---|---|---|---|
| 0x01 | Association request | X | | 7.3.1 |
| 0x02 | Association response | | X | 7.3.2 |
| 0x03 | Disassociation notification | X | X | 7.3.3 |
| 0x04 | Data request | X | | 7.3.4 |
| 0x05 | PAN ID conflict notification | X | | 7.3.5 |
| 0x06 | Orphan notification | X | | 7.3.6 |
| 0x07 | Beacon request | | | 7.3.7 |
| 0x08 | Coordinator realignment | | X | 7.3.8 |
| 0x09 | GTS request | | | 7.3.9 |
| 0x0a-0xff | Reserved | | | - |

FIG. 26

SHORT RANGE WIRELESS NETWORKS

CROSS REFERENCE TO RELATED APPLICATIONS

This application is a national phase application, under 35 U.S.C. 371, of international application No. PCT/EP2010/051593, filed on Feb. 9, 2010, which claimed priority to European Patent Application No. 09154362.9, filed on Mar. 4, 2009, the disclosures of all of which are incorporated herein by reference.

The present invention relates to wireless personal area networks and particularly, but not necessarily exclusively, to wireless sensor networks and to body area networks including wirelessly-communicating sensors disposed on or around a human or animal body.

The so-called Body Area Network or BAN is an example of wireless personal area networks (WPANs), used to convey information over relatively short distances.
Unlike wireless local area networks (WLANs), connections effected via WPANs involve little or no infrastructure. This feature allows small, power-efficient, inexpensive solutions to be implemented for a wide range of devices. Of particular interest is the possibility of the medical BAN (MBAN) in which sensors are used to monitor the status of a patient. A BAN employing mainly sensors for feeding sensed data to a data sink (which may also be a network co-ordinator) is an example of a wireless sensor network (WSN); however, more active devices, such as actuators, may be also be included in a WSN acting as an MBAN.

Another interesting use of short-range wireless networks is in industrial monitoring. Such wireless networks may be designed to include sensors and other devices. For example, one deployment would include sensors arranged to measure a parameter such as temperature at various different positions on a turbine blade or other industrial part for monitoring. Again, more active devices can be included in such a wireless network and little or no infrastructure is required.

Standard IEEE 802.15.4 defines the physical layer (PHY) and medium access control (MAC) sublayer specifications for low data-rate WPANs, although the coverage of an IEEE 802.15.4 network may extend beyond a personal operating space (POS) which typically defines the WPAN and is thus also suitable for somewhat larger-scale industrial deployment. Such slightly larger-scale networks are included within the terms WSN, WPAN and BAN for the purposes of this application. IEEE 802.15.4 has some similarities with a standard for an ad-hoc piconet, IEEE 802.15.3. Such piconets around a person or object typically cover at least 10 m in all directions and envelop the person or object, whether stationary or in motion. They include higher data-rate WPANs. The documents IEEE Std 802.15.4-2006 and IEEE Std 802.15.3-2003 are hereby incorporated by reference in their entirety.

WPANs of the type envisaged in IEEE 802.15.4 are suitable for applications such as industrial monitoring, but do not offer the kind of data reliability required for MBANs.

In medical applications, there is a requirement to reduce the costs associated with human labour while increasing the reliability and process automation and reducing human error. Sensors can provide the required intelligence, and already are widely employed in medical equipment. This includes hospital recuperative care, home care, intensive care units and advanced surgical procedures. There are many different types of sensors employed for medical applications, including external sensors for pulse, temperature etc., sensors which come in contact with body fluids, sensors used in catheters (through incision), sensors for external applications, disposable skin patches with wireless sensors, and implantable sensors.

A WPAN of sensors around a patient in a hospital or medical ward could provide multiple clinical benefits including patient mobility, monitoring flexibility, extension of monitoring into care areas that are currently unmonitored, reduced clinical errors and reduced overall monitoring costs. Body worn sensors may include various sensor types on single patient body. They require a capability to be applied or removed quickly from the patient's body.

On an individual basis, such sensors may have bit rates of as low as 1-2 kbps per patient and on an aggregate basis they may require a 10 kbps bit rate. A range of as little as 1 meter may be adequate. However, medical WSN applications are mission critical applications in the clinical environment. Robust wireless links for bounded data loss and bounded latency, capacity for patient and sensor density, coexistence with other radios, battery life for days of continuous operations and small form factors for body worn devices, are among the requirements for medical WSNs or MBANs. These requirements can be satisfied through utilization of techniques such as diversity and error control techniques in the time and frequency domain, including Forward Error Correction (FEC) and Adaptive Repeat reQuest (ARQ), low duty cycle TDMA for sensor information rate, and more efficient small antennas. Efforts are therefore in progress to define a further standard IEEE802.15.6 which aims to define the properties of Body Area Networks, particularly for medical applications.

One of the key requirements of IEEE 802.15.3, IEEE 802.15.4, IEEE802.15.6 and other standards related to wireless networks including sensors, in which at least some of the devices are powered by batteries, is conserving battery life. This is especially important for emergency situations in which the life of the patient depends on the reliability of wireless links in medical WSN applications, or for monitoring mission critical industrial environments, such power stations. Battery-powered devices usually require duty cycling to reduce power consumption. Duty-cycling devices have a sleep pattern, spending much of their operational life in a sleep state. Such devices "wake up" periodically to transmit or receive.

The Sleep/wake up pattern (referred to as sleep pattern in the following) is periodic and determines the length of time for which a device is awake during each period of time. During wake up time, the device, for example a sensor, sends the measurements or other data it has already gathered. If the sensor finishes sending the measurement before the end of the wake up time, it goes back to sleep and follows the sleep pattern already set for it. If the sensor did not finish data transmission before the end of wake up time, it can continue the transmission of the measurement and then go back to sleep according to the sleep pattern. Thus, there is a distinction between the sampling rate of measurement at the sensor and the transmission rate of measurement (duty cycle). For example there may be a scenario under which the measurement itself is very slow (e.g. large information gathered in a measurement attempt) and requires many transmission attempts to send the information on a piece-by-piece basis.

We may assume a period or a random pattern for measurements. The measurements arrive faster with a more aggressive transmission of the (faster) wake-up pattern. The primary reason to change the sleep pattern is to have more up-to-date and fresher information as to the life parameters (i.e. faster measurements). The nature of the medical or other critical application would decide how fast the sleep pattern is. For example, for cardiac applications it depends on the live entity we deal with. For humans the pattern is slower than for animals (say in extreme cases quarter of a second for human and tenth of second for a mouse).

There is a need to address the issue of conserving battery life using sleep patterns while making sure that the sensor data is sent to the network in a timely and reliable manner. According to embodiments of a first aspect of the present invention, there is provided a sensor for use in a wireless sensor network of devices, comprising: sensing means operable to detect values of a parameter; control means operable to determine a suitable sleep pattern of the sensor taking into account the detected values and a transmitter operable to transmit an indication of the suitable sleep pattern to a further device in the wireless sensor network.

Not only can sensors of invention embodiments autonomously determine their own sleep pattern, they are also operable to transmit an indication of a suitable sleep pattern to a further device in a wireless sensor network. This indication can be transmitted directly to the coordinator of the network (for example for use in influencing its functioning) or transmitted indirectly via other devices, which may then also use the indication, if appropriate. The skilled reader will appreciate that the indication may be provided and transmitted with other information. For example separate information as to an emergency status (perhaps in the form of an emergency bit) may be provided.

Preferably the indication is transmitted in a control field of a transmission frame, for example using a value set in the MAC header, such as in the frame control field to a predetermined value. In one preferred embodiment, the value can be one or more bits acting in combination to designate a suitable predefined sleep pattern. The value could be in the frame control field of any transmission frame. Alternatively, the value could be a device state description (maybe a full octet, including the indication and potentially other information such as a warning/emergency status) in a MAC frame. In this case the MAC frame control could include a device state bit to indicate whether the device state description should be read and interpreted.

In preferred embodiments, transmission of the indication takes priority over other transmissions from the sensor. For example, transmissions including the indication can be scheduled before transmissions not including the indication. Alternatively, the indication can be sent in all transmission frames sent from the device permanently, or over a particular time period.

Preferably the sensor further comprises a receiver operable to receive an acknowledgement of the indication. The term 'operable' used herein, includes the idea of the means defined being arranged to carry out the function specified in use. The acknowledgement can be linked to a re-send of the indication if there is a failure.

The detected values may be taken into account to determine a suitable sleep pattern by comparison against one or more thresholds, by detection of a change in the parameter or by detection of a rate of change or in any other suitable way for the parameter being measured. In many situations, a simple comparison against one or more thresholds is appropriate.

Thus a sensor according to invention embodiments may further comprise memory and processing means operable to compare the detected values against a stored threshold; wherein the control means are operable to determine the suitable sleep pattern of the sensor taking into account a result of the comparison.

The sleep pattern can be defined in real time. For example one or more different thresholds, different values or different changes and rates of change can be used to calculate a suitable sleep pattern in terms of percentage wake-up time, time between transmissions or any other suitable definition. In other cases, predefined sleep patterns can be stored in the sensor.

In preferred embodiments there is a number of predefined sleep patterns determined by the number of thresholds, each threshold defining a boundary between a lower wake-up and a higher wake-up sleep pattern. Here, a lower wake-up sleep pattern may indicate a lower duty cycle or longer time between transmissions and a higher wake-up sleep pattern can indicate a higher duty cycle or shorter time between transmissions.

Where a battery (which is taken to mean any means of powering the sensor which is depletable and thus requires replacement and/or recharging) is present, it can be advantageous to adjust the sleep pattern to reflect this. Otherwise, the control means can simply implement the sleep pattern which has been determined as suitable taking the detected values into account.

Preferably a sensor as described above further comprises a battery, wherein the control means are operable to control the sleep pattern taking into account both the detected values and a current battery charge of the sensor. For example, the actual sleep pattern may be selected based on a combination of these factors and potentially other factors.

Advantageously, the transmitter is additionally operable to transmit information relating to the current battery charge, preferably in the form of an indication of the actual sleep pattern selected by the control means. This indication may be transmitted in the same way as/in conjunction with the suitable sleep pattern indication and any other information, such as emergency status of the device.

Thus for example, the control means may allow or reject suitable sleep patterns according to a predefined limit of acceptable battery charge. The control means can be designed to override any rejected suitable sleep pattern with a lower wake-up sleep pattern. Preferably, the lower wake-up pattern is the predefined sleep pattern with the maximum wake-up pattern allowed by the battery.

If there is more than one limit between different levels of battery charge, the control means allowing fewer sleep patterns below each limit than above it, then preferably the number of limits is equal to the number of thresholds.

In a further aspect, invention embodiments provide a wireless sensor network of devices including a sensor and a coordinator:

the sensor comprising sensing means operable to detect values of a parameter; transmission and reception means; and sensor control means operable to control the sleep pattern of the sensor; and the coordinator comprising transmission and reception means; wherein the sensor is operable to determine its own suitable sensor sleep pattern taking into account the detected parameter values, and to influence coordinator operation by transmission of an indication of its suitable sleep pattern.

Preferably, in such a wireless sensor network, the sensor comprises memory and processing means operable to compare the detected values against a stored threshold; the sensor control means are operable to determine a suitable sleep pattern of the sensor taking into account a result of the comparison; the sensor transmission means are operable to transmit an indication of the suitable sleep pattern; and the coordinator is operable to reflect the indication in its channel access strategy.

In yet further aspects, invention embodiments provide a coordinator in a wireless sensor network of devices including sensors and the coordinator, wherein the coordinator comprises transmission and reception means for communication with the sensors; and coordinator control means operable to influence functioning of the coordinator in response to an indication of a suitable sleep pattern transmitted by a particular one of the sensors.

Preferably the coordinator control means are operable to influence functioning of the coordinator taking into account both the indication and information about a current battery charge level of the particular sensor.

Advantageously, the coordinator is operable to reflect the indication and/or the information about the current battery charge level in its channel access strategy.

In one method aspect, the present invention relates to a method in a sensor of a wireless sensor network of devices comprising:

detecting values of a parameter;

determining a suitable sensor sleep pattern taking into account detected values; and transmitting an indication of the suitable sleep pattern to a further device in the wireless sensor network. Preferred features of this method aspect correspond to the preferred features of the sensor set out above.

Further aspects of the present invention provide software (or a computer program) which, when executed by a processor of a sensor or a coordinator of a wireless sensor network provides functionality of the above sensor or coordinator respectively and software which, when executed by a sensor or coordinator, carries out the methods described for these devices. Such software may be stored on a computer-readable medium.

Features and preferred features of any of these aspects are freely combinable.

For a better understanding of the present invention, and to show more clearly how it may be carried into effect, reference will now be made, by way of example only, to the following drawings in which:

FIG. 16 is an illustration of sleep patterns allowed at different battery levels;

FIG. 19 shows the novel structure of the Frame Control Field proposed in an embodiment of the present invention;

FIG. 20 shows the novel structure of the Frame Control field proposed in an embodiment of the present invention including battery status considerations;

FIG. 21 shows the novel structure of the Frame Control field proposed in an embodiment of the present invention including battery status considerations and other enhancements;

FIG. 22 illustrates possible frame type bits in the Frame Control field of FIG. 21;

FIG. 23 shows another novel structure of the Frame Control field incorporating the new bits illustrated in FIG. 21;

FIG. 24 shows another novel structure of the Frame Control field as for FIG. 22 but incorporating the new bits illustrated of FIG. 23;

FIG. 25 illustrates the basic format of a MAC frame in the current IEEE 802.15.4 standard; and FIG. 26 illustrates the Command Frame Identifier list of the current version of IEEE 802.15.4 standard.

Before explaining the embodiments of the present invention, some background explanation will be given of those parts of IEEE 802.15.4 which are expected to have relevance for the design of wireless networks (such as piconets, WPANs and BANs, including MBANs) having devices having a variable sleep pattern and/or could be used as a basis for the IEEE 802.15.6 standard currently under development.

Figure 1:
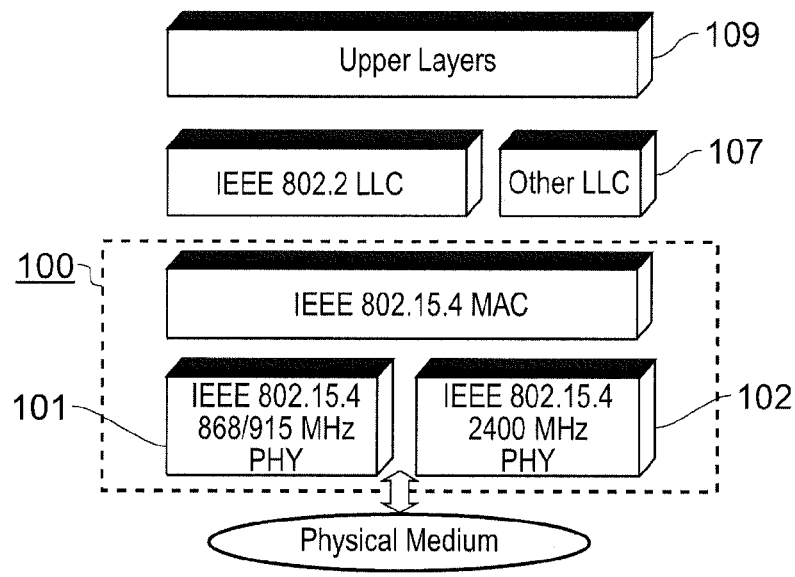
FIG. 1 illustrates protocol layers in an IEEE 802.15.4 WPAN.
Figure 2:
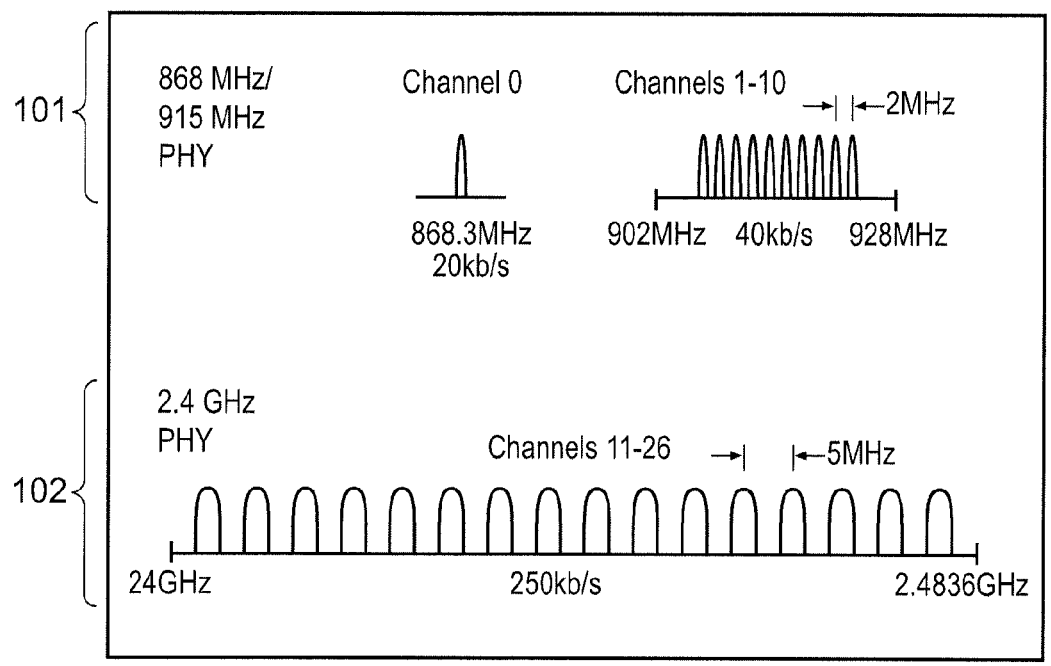
FIG. 2 illustrates possible PHY bands of the IEEE 802.15.4 WPAN.

FIG. 1 shows the general architecture of an IEEE 802.15.4 WPAN, labelled 100, in terms of the layered OSI model, in which the physical medium is accessed via a PHY layer containing the radio transceiver and its low-level control. As shown, there are two alternative frequency bands 101, 102 for the PHY, which are illustrated in FIG. 2. The lower frequency band 101 provides a single 20 kb/s channel centred on 868.3 MHz, and/or ten channels each of 40 kb/s centred on 915 MHz. The higher frequency band 102 provides 16 channels each of 250 kb/s and centred on a frequency of 2.44 GHz. Which of these bands is used will depend on local regulatory requirements.

Access to the PHY is provided by a MAC (Medium Access Control) sublayer indicated by 105 in FIG. 1. Above this, and external to the WPAN 100 as such, are provided a LLC (Link Layer Control) allowing access to the WPAN from other networks; this may be in accordance with the IEEE 802.2 standard, or of another type. Finally, upper layers 109 above the LLC include a network layer to provide network configuration, manipulation, and message routing, and an application layer which provides the intended overall function.

Figure 3:
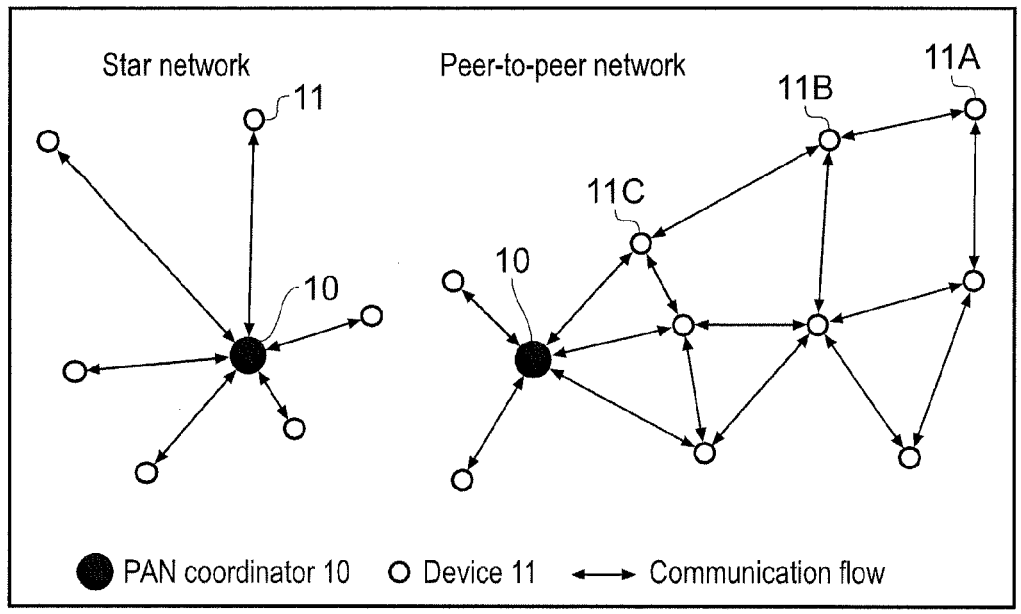
FIG. 3 illustrates Star and Peer-to-Peer topologies of a WPAN.

One task of the MAC sublayer is to control the network topology. Star and peer-to-peer are two known topologies in communications networks, and both are provided for in IEEE 802.15.4. In both cases, the topology distinguishes between two basic kinds of network node: devices and coordinators. As shown in FIG. 3, in the Star topology a number of devices 11 communicate directly with a central co-ordinator 10; whilst in the peer-to-peer configuration, communications by a device 11A with the communicator are made along one or more hops with intermediate devices 11B and 11C acting as relays. The coordinator acts as the access point to the upper layers; in the case of a WSN, it acts as the sink for the data collected by the sensors. Given that the communication range of each device may be very limited (a few meters), the peer-to-peer topology allows a greater area to be covered. The topology may be dynamic, changing as devices are added or leave the network.

In the case of industrial WSNs, for example, a star network might be appropriate to monitor readings from sensor on a single stationary item of machinery with moving parts. A peer-to-peer topology, on the other hand, could be used to monitor objects on a conveyer belt.

In the case of MBANs, for example, a star network would be appropriate in the case where a coordinator is provided at each patient site (such as a hospital bed), exchanging signals with devices on a single patient. Peer-to-peer would be a more appropriate topology where one coordinator was provided to serve a number of patients (the coordinator might be located at a fixed point in a hospital ward). Thus, whilst the devices 11 will generally be mobile the coordinator may be either mobile or fixed. Peer-to-peer networks may also be more suited to fast-changing environments where it is required to set up or change the network quickly, or to allow self-organisation and self-healing of the network. Self-healing may include, for example, establishing a new coordinator in the event that an existing coordinator has failed or left the network.

Multiple star and/or peer-to-peer networks may be set up in the same location such as a hospital or factory, each with their own coordinator. In this case it will be necessary for the respective coordinators to collaborate in order to avoid mutual interference and to allow sharing or collation of data. In IEEE 802.15.4 such networks are called clusters, and provision is made for establishing an overall coordinator for the clusters as well as for dividing and merging clusters.

Nodes in a WPAN may be constituted by units of varying capabilities. Generally, the role of coordinator will require a relatively capable apparatus with some processing power and transceiver capable of handling transmissions from multiple sources simultaneously. This in turn will necessitate a sufficient provision of electrical power (in some cases, it may be mains powered). On the other hand, other devices in the network may have more limited processing ability and access only to battery power, and may even be so simple as to be unable to act as a relay hop. Devices with very low power availability may be shut down most of the time and only "wake up" occasionally, for example to transmit sensor data to another node. Thus, the IEEE 802.15.4 standard distinguishes between "full-function" and "reduced function" devices. Availability of power is a particular issue for MBANs and other WPANs in which sensors may be implanted within a body or device and thus unable to have a large or rechargeable battery.

Two types of WPAN envisaged in IEEE 802.15.4 are beacon-enabled and non beacon-enabled.

Figure 4:
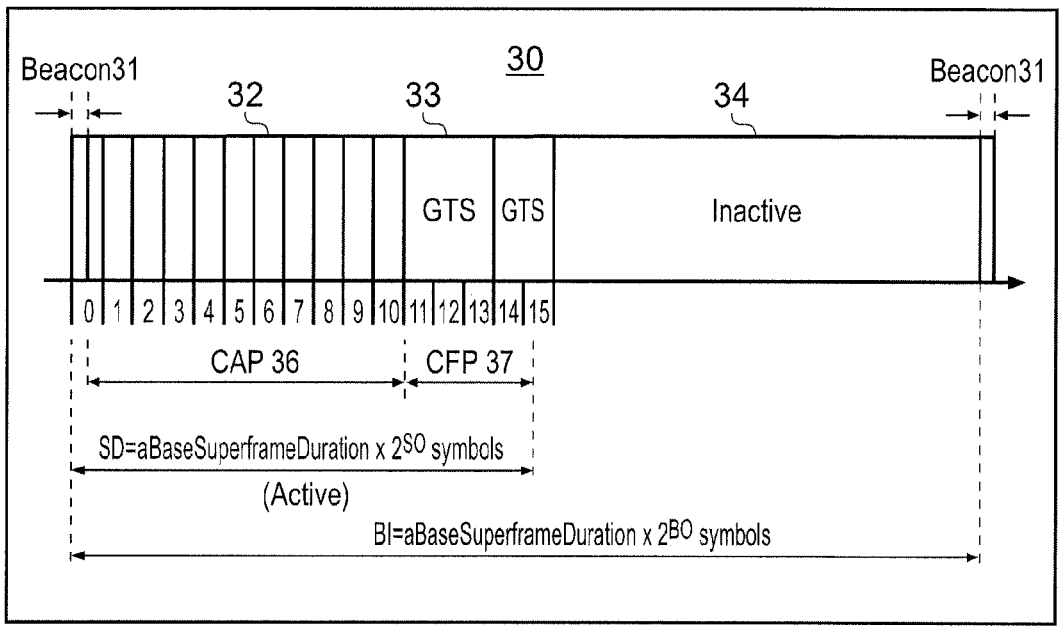
FIG. 4 shows the structure of a superframe in a beacon-enabled IEEE 802.15.4 WPAN.

In a beacon enabled network, the coordinator transmits a beacon periodically and devices listen periodically to that beacon to synchronize to the network and to access the channel. The channel access follows a superframe structure as shown in FIG. 4, which is defined by the coordinator. Each superframe 30 consists of two parts: active and inactive. The active part is divided into a contention access period CAP 36, followed by an optional contention free period CFP 37 for guaranteed access for applications with quality of service requirement.

As indicated by the vertical divisions in FIG. 4, the superframe is divided into 16 equally-spaced time slots each capable of carrying a frame of data from the coordinator or from a device. First comes a slot 31 for a beacon frame (see below) transmitted by the coordinator. After this, several slots 32 are provided within the CAP, allowing data transmission to or from devices on a contended basis, following the known CSMA-CA algorithm. Briefly, in CSMA-CA, each time a device wishes to transmit within the CAP, it waits for a random period. If the channel is found to be idle, following the random backoff, the device transmits its data. If the channel is found to be busy following the random backoff, the device waits for another random period before trying to access the channel again.

Next there follow the guaranteed time slots GTS 33 of the CFP, and as shown, each of these may extend over more than one basic time slot. After the expiry of the inactive period, the next superframe is marked by the coordinator sending another beacon frame 31. Devices can go to sleep during the inactive period 34 of the superframe. Thus, by extending the length of the inactive period 34, battery power of devices can be conserved as much as possible.

In the non beacon enabled network, the coordinator is not required to transmit a beacon for synchronization unless it is requested to do so (e.g. for network discovery purposes). The channel access is not restricted by the superframe structure and devices are asynchronous, performing all data transfers by CSMA-CA. They can follow their own sleeping pattern (or duty cycle) according to a certain protocol such as sensor—MAC.

For an MBAN application, the coordinator is external to the body or bodies being monitored. It may be a PDA, a mobile phone, a bedside monitor station or even a sufficiently-capable sensor which on a temporary basis acts as a coordinator. In an industrial WSN, the coordinator may be a PDA, a sensor, a laptop or other computer, or even a central or regional processor. As mentioned above, the coordinator in the beacon enabled network, is in charge of providing synchronization and channel access to network devices. The start and end of a superframe is also defined by a coordinator. The coordinator has two main features of potential communications to other networks and access to a sufficient power supply, for example by easy replacement of the charged batteries.

FIGS. 5 to 8 illustrate data transfers between a device and a coordinator in an IEEE 802.15.4 network. Three basic types of transfer are defined in IEEE 802.15.4:

(i) data transfer to a coordinator as recipient to which a device (sender) transmits its data—used in both star and peer-to-peer topologies;

(ii) data transfer from a coordinator as sender in which the device receives the data—used in both star and peer-to-peer topologies; and (iii) data transfer between two peers—used in peer-to-peer networks only.

Figure 5:
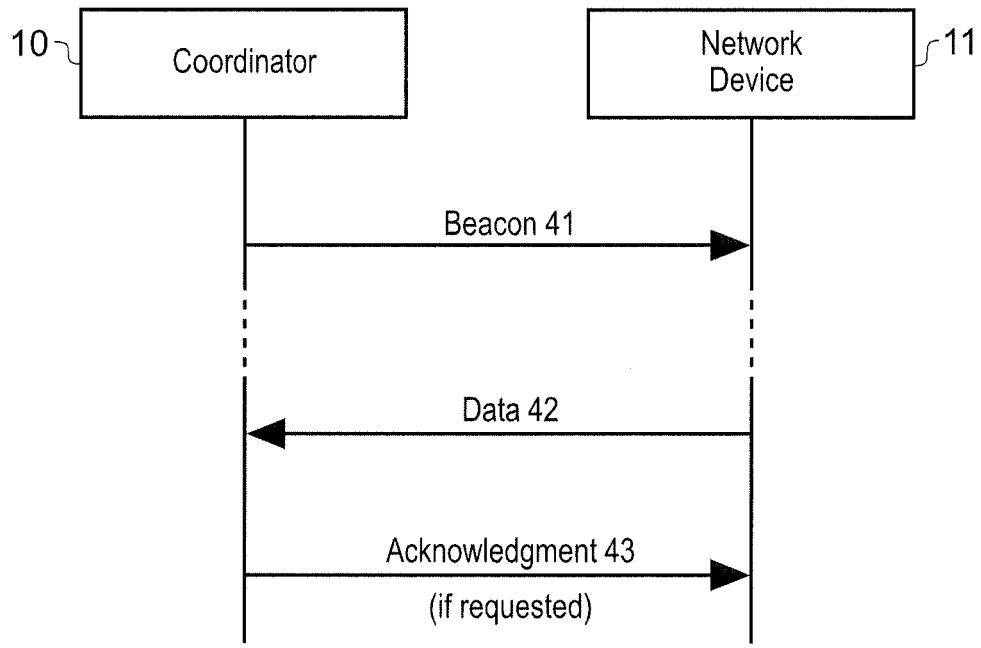
FIGS. 5 to 8 illustrate possible modes of data transfer between a network device and a co-ordinator in a IEEE 802.15.4 WPAN.
Figure 6:
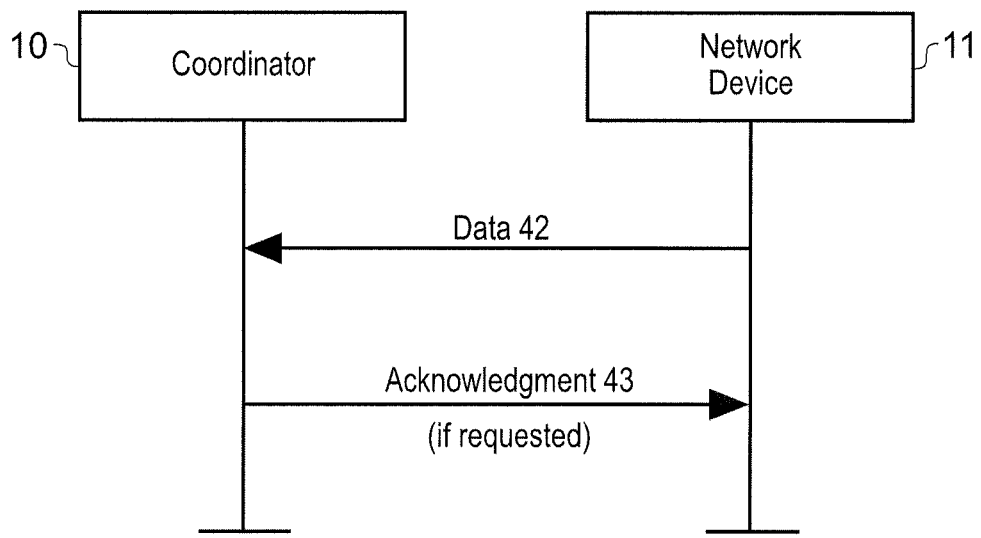

FIGS. 5 and 6 depict a transfer from the device (Network Device 11) and coordinator (Coordinator 10) for both the beacon-enabled and non beacon-enabled case respectively. The difference is that in the beacon-enabled case the device 1 must wait to receive a beacon frame 41 from the coordinator prior to sending the data (data frame 42) using CSMA-CA in the CFP, or using a GTS in the CAP; whilst in the non beacon-enabled case there is normally no beacon frame and the device 11 sends a data frame 42 at will using CSMA-CA. In either case, the coordinator acknowledges the successful reception of the data by transmitting an optional acknowledgment frame 43. These different types of frame are explained in more detail below.

If the recipient is unable to handle the received data frame for any reason, the message is not acknowledged. If the sender does not receive an acknowledgment after some period, it assumes that the transmission was unsuccessful and retries the frame transmission. If an acknowledgment is still not received after several retries, the sender can choose either to terminate the transaction or to try again. When the acknowledgment is not required, the sender assumes the transmission was successful.

Figure 7:
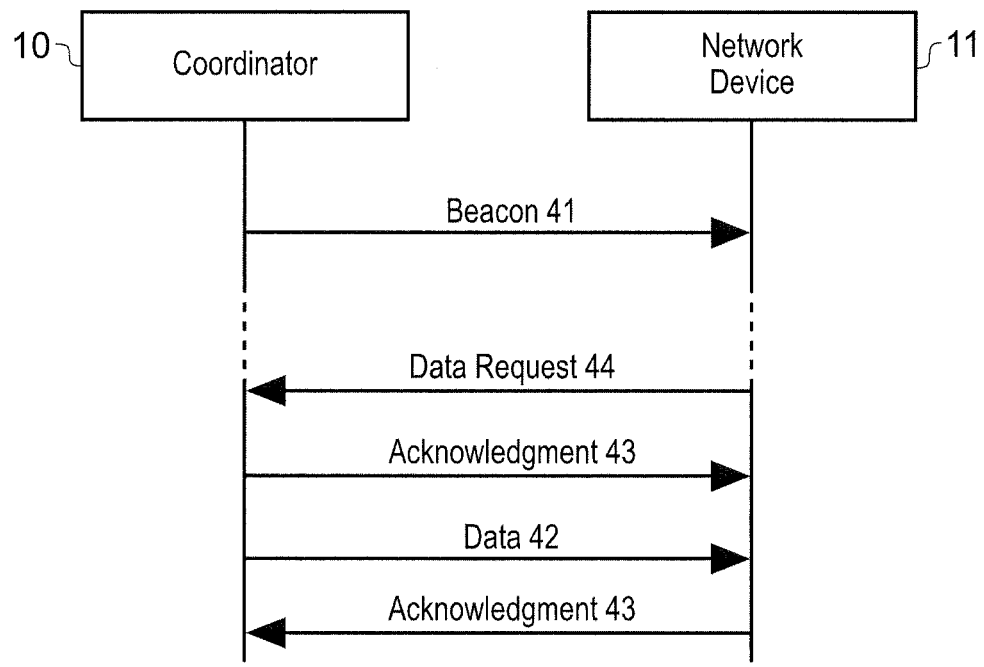
Figure 8:
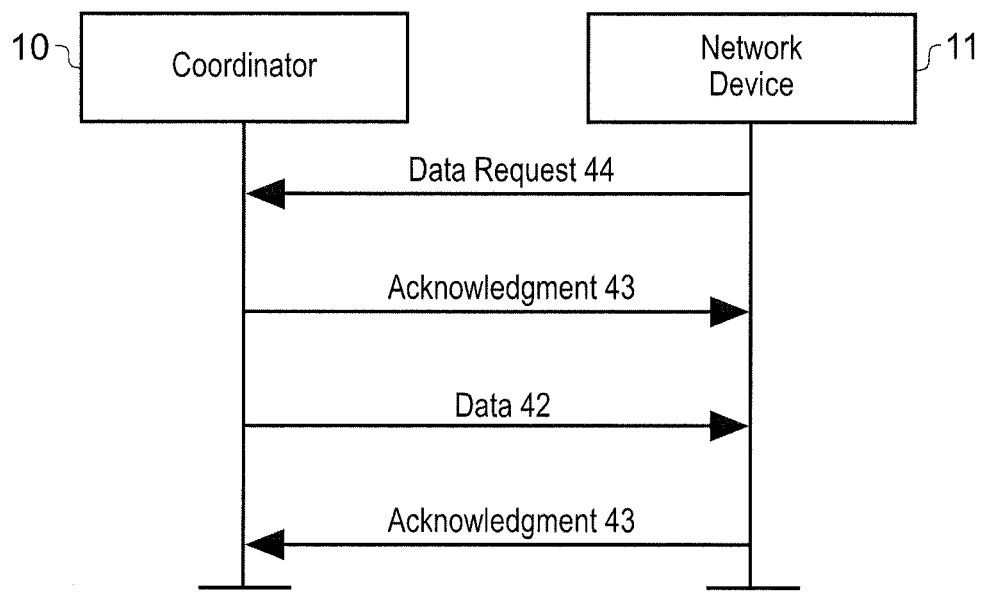

FIGS. 7 and 8 illustrate data transfer from a coordinator 10 to a device 11. When the coordinator wishes to transfer data to a device in a beacon-enabled WPAN (FIG. 7), it indicates in the beacon frame 41 that the data message is pending. The device periodically listens to the beacon frame and, if a message is pending, transmits a data request (MAC command) 44 requesting the data by CSMA-CA. The coordinator 10 acknowledges the successful reception of the data request by transmitting an acknowledgment frame 43. The pending data frame 42 is then sent using slotted CSMA-CA or, if possible, immediately after the acknowledgment. The device 11 may acknowledge the successful reception of the data by transmitting an optional acknowledgment frame 43. The transaction is now complete. Upon successful completion of the data transaction, the message is removed from the list of pending messages in the beacon.

In the non beacon-enabled case, the coordinator 10 which has data ready for a particular device 11 has to wait for a data request 44 from the device concerned, sent on a contention basis. Upon receiving such a request, the coordinator sends an acknowledgement frame 43 (this can also be used to signify that no data is ready, if that is the case), followed by the data frame 42, in response to which the device 11 may send another acknowledgement frame 43 in return.

For simplicity, the above procedures have considered only the above cases (i) and (ii) of data transfers between the device and coordinator, but in a peer-to-peer network, as already mentioned, data transfers will generally take place via mechanism (iii), involving one or more intermediate nodes, which increases the risk of collision and the delays involved.

As indicated in FIGS. 5 to 8, communications in a IEEE 802.15.4 network involve frames of four different types:
  beacon frame 41, used by a coordinator to transmit beacons
  data frame 42, used for all transfers of data
  acknowledgment frame 43, used for confirming successful frame reception
  MAC command frame 44, used for handling all MAC peer entity control transfers such as data requests.

Figures 9, 10, 11:
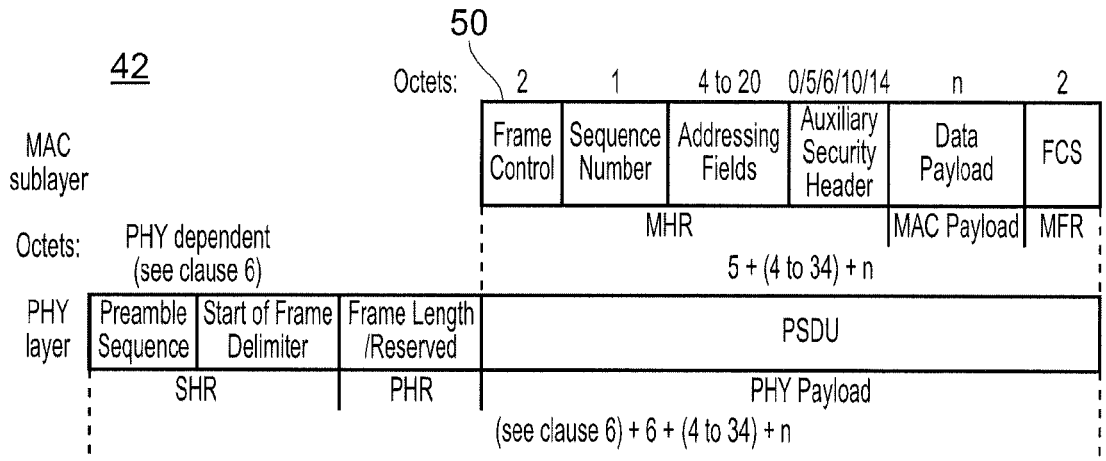
FIG. 9 shows a frame format used for a data frame in a IEEE 802.15.4 WPAN.
FIG. 10 shows the structure of a Frame Control field in the frame format of FIG. 9.
FIG. 11 is a table of possible values of frame type bits in the Frame Control field of FIG. 10.

The structure of each of the four frame types is quite similar, and is shown in FIG. 9 for a data frame 42 by way of example. In the Figure, the two horizontal bars represent the MAC sublayer and the PHY layer respectively. Time progresses from left to right, and the time length of each successive field of the frame is shown (in octets) above the field concerned. Every frame consists of a sequence of fields in a specific order, these being depicted in the order in which they are transmitted by the PHY, from left to right, where the leftmost bit is transmitted first in time. Bits within each field are numbered from 0 (leftmost and least significant) to k−1 (rightmost and most significant), where the length of the field is k bits.

The data to be sent via the data frame 42 originates from the upper layers. The data payload is passed to the MAC sublayer and is referred to as the MAC service data unit (MSDU). The MAC payload is prefixed with an MAC Header MHR and appended with a MAC Footer MFR. The MHR contains the Frame Control field 50 (see below), data sequence number (DSN), addressing fields, and optional auxiliary security header. The MFR is composed of a 16-bit frame check sequence FCS. The MHR, MAC payload, and MFR together form the MAC data frame, (i.e., MPDU). The MPDU is passed to the PHY as the PHY service data unit PSDU, which becomes the PHY payload. The PHY payload is prefixed with a synchronisation header SHR, containing a Preamble Sequence and a start-of-frame delimiter SFD, and a PHY header PHR containing the length of the PHY payload in octets. The preamble sequence and the data SFD enable the receiver to achieve symbol synchronization. The SHR, PHR, and PHY payload together form the PHY packet (the PHY protocol data unit PPDU).

The beacon frame 41, acknowledgement frame 43 and MAC command frame 44 have a similar structure, except that the MAC payload has a different function in each case, the acknowledgement frame having no MAC payload. Also, the beacon frame 41, the acknowledgement frame 43 and MAC command frame 44 originate in the MAC sublayer without involvement of the upper layers.

The frame control field 50 used in each type of frame is shown in more detail in FIG. 10. It consists of 16 bits assigned to subfields for different purposes as illustrated. In particular, the first three bits of the field denote the Frame Type 51: beacon frame 41, data frame 42, acknowledgement frame 43, or MAC command frame 44. The way the frame type is signified is shown in FIG. 11. Following the frame type bits 51 is a single-bit Security Enabled subfield 52 denoting whether or not security is enabled by the MAC sublayer. This is followed by a Frame Pending subfield 53 to indicate whether the sender has more data for the recipient. Next is an Ack. Request subfield 54 to indicate whether an acknowledgement is requested from the recipient. After this follow some further sub-fields 55, to 59 which are used for addressing purposes or reserved in the current IEEE 802.15.4 specification.

As mentioned, FIG. 11 is a table of the possible bit values for the Frame Type subfield 51, showing that values 100 and 101 are unused in the IEEE 802.15.4 specification.

Figure 12:
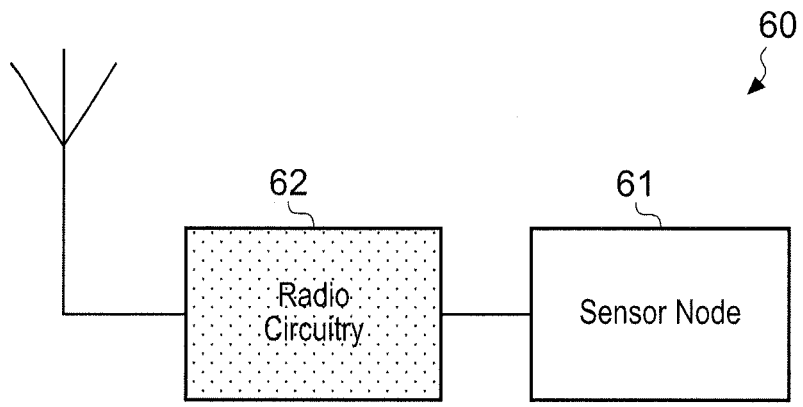
FIG. 12 is a schematic diagram showing a wireless sensor.

Having outlined the background of the present invention, reference is now made to relevant prior art. FIG. 12 is a schematic diagram representing a prior art sensor 60 which measures a parameter using sensor node 61 and transmits it to another device using radio circuitry 62.

Embodiments of the present invention provide a sensor and a WSN including such a sensor in which the sensor not only selects its own sleep pattern, but also transmits this sleep pattern to a further device in the WSN.

Figure 13:
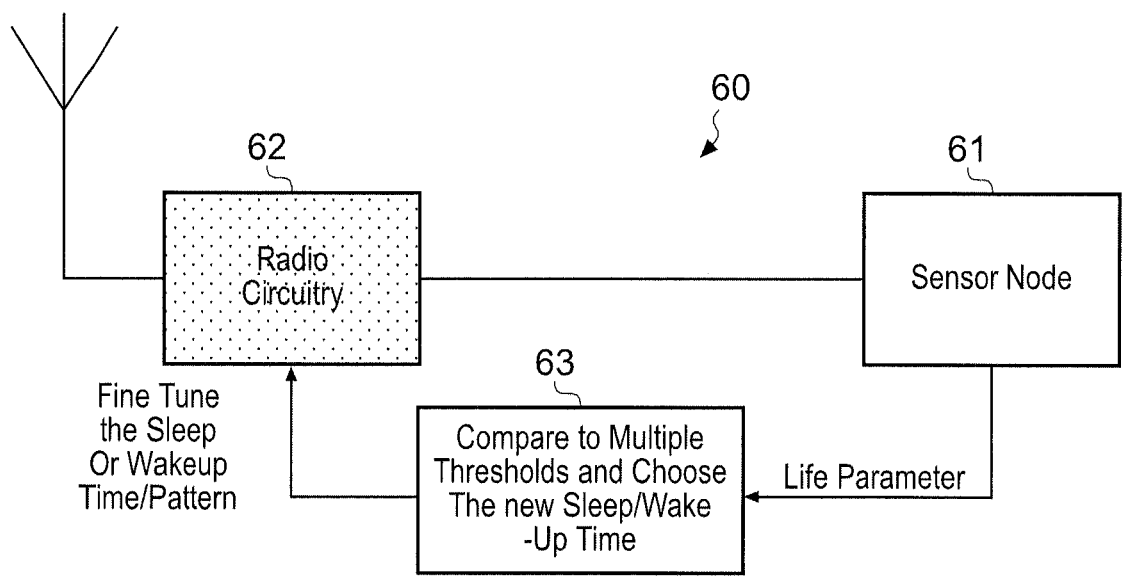
FIG. 13 is a schematic diagram showing a sensor according to embodiments of the present invention.

FIG. 13 is a schematic diagram of a wireless sensor that can select its own sleep pattern. The wireless sensor shown measures a parameter. For example, the sensor 60 shown in FIG. 13 may measure a life parameter, such as the glucose level of a patient using sensor node 61. The glucose level (or other parameter) can be compared to multiple predefined thresholds available in the sensor memory 63 as a look-up table. This comparison can allow a new sleep pattern to be selected and the radio circuitry 62 to be fine tuned accordingly. Once the new sleep pattern has been selected, the sensor transmits an indication of the sleep pattern to a further device such as another sensor in a peer-to-peer network or directly to a coordinator in a star network.

In this and in the following scenarios, the messages sent indicating a change of sleep pattern are deemed themselves to have high priority and thus are given priority over other transmissions, for example routine and maintenance transmissions from the device or data transmissions which for some reason do not include the indication of the sleep pattern.

The description of the embodiments does not refer to any acknowledgements from the coordinator to the sensor whether direct or indirect and signal flow diagrams shown in the present application do not include them. However, since the sleep pattern messaging has a higher priority than other data/information, the sleep pattern messages are preferably acknowledged, and ideally before any change of sleep pattern.

Table 1 below gives an example of different suitable predefined sleep patterns based on different urgency levels of devices in a WSN. For example, in a network for medical use such as an MBAN, a low duty cycle sleep pattern can be used for non-medical devices (for example for a doctor's PDA, a watch or a mobile phone of the patient which are connected into the WSN). As can be seen from Table 1, such non-medical devices thus have the longest sleep time or percentage sleep time. An indication of this sleep pattern can be sent over the WSN, for example as urgency bits in a frame control field of a transmission frame. In this example, a non-medical device is shown to have urgency bits 00. Table 1 shows a medical device in a normal condition having a normal medical pattern sleep with a slightly higher duty cycle and denoted by urgency bits 01. With a slightly abnormal condition in such a medical device the duty cycle is again increased slightly and the urgency bits are 10. Finally, for a medical device in an emergency situation there is a dramatic increase in the duty cycle or a continuous wake up. Urgency bits 11 are used to denote this emergency condition. In this example for a medical device the transition between the normal and slightly abnormal situation and between the slightly abnormal and emergency situation can be triggered by the measured parameters crossing each threshold in each case. As a skilled reader would appreciate, the increased urgency may be down to the parameter either falling or rising or both, if the parameter has an acceptable range of values, with increasingly unacceptable values to either side of the acceptable range defined by a number of thresholds.

TABLE 1 sleep patterns and urgent bits with a mixed network of medical and non-medical devices.

| Urgency bits | Urgency level | Sleep pattern |
|---|---|---|
| 00 | Non-Medical Device | Longest Sleep Time |
| 01 | Medical Device with normal Situation | Normal Medical Pattern Sleep |
| 10 | Medical Device in Slightly Abnormal conditions | Increase slightly duty |
| 11 | Medical Device in Emergency Situation | Increase dramatically or continuous wake up |

Also, as briefly set out above, in some embodiments the change in sleep pattern can be triggered by a change in parameter values over time or in a rate of change or parameter values over the time or any other suitable criteria. For example, a very rapid change in pulse rate may be due to a pathological arrhythmia, rather than physiological conditions and therefore suitable for triggering a changed sleep pattern taking a rate of change into account.

The bit values in Table 1 are fixed for all devices and their interpretation is known to the coordinator or controller. These bits or some other indication can be employed by the controller for scheduling or other resource management.

For example, when considering channel access, the coordinator can allocate a priority to different sensors in the network depending on their sleep pattern and transmitted indication of the sleep pattern. Thus, for instance, in a network including a non medical device, a medical device in a normal situation and a medical device in an emergency situation, the coordinator can use the indication to allocate the non-medical device low priority, the medical device in a normal situation middle priority and the medical device in an emergency situation top priority.

Figure 14:
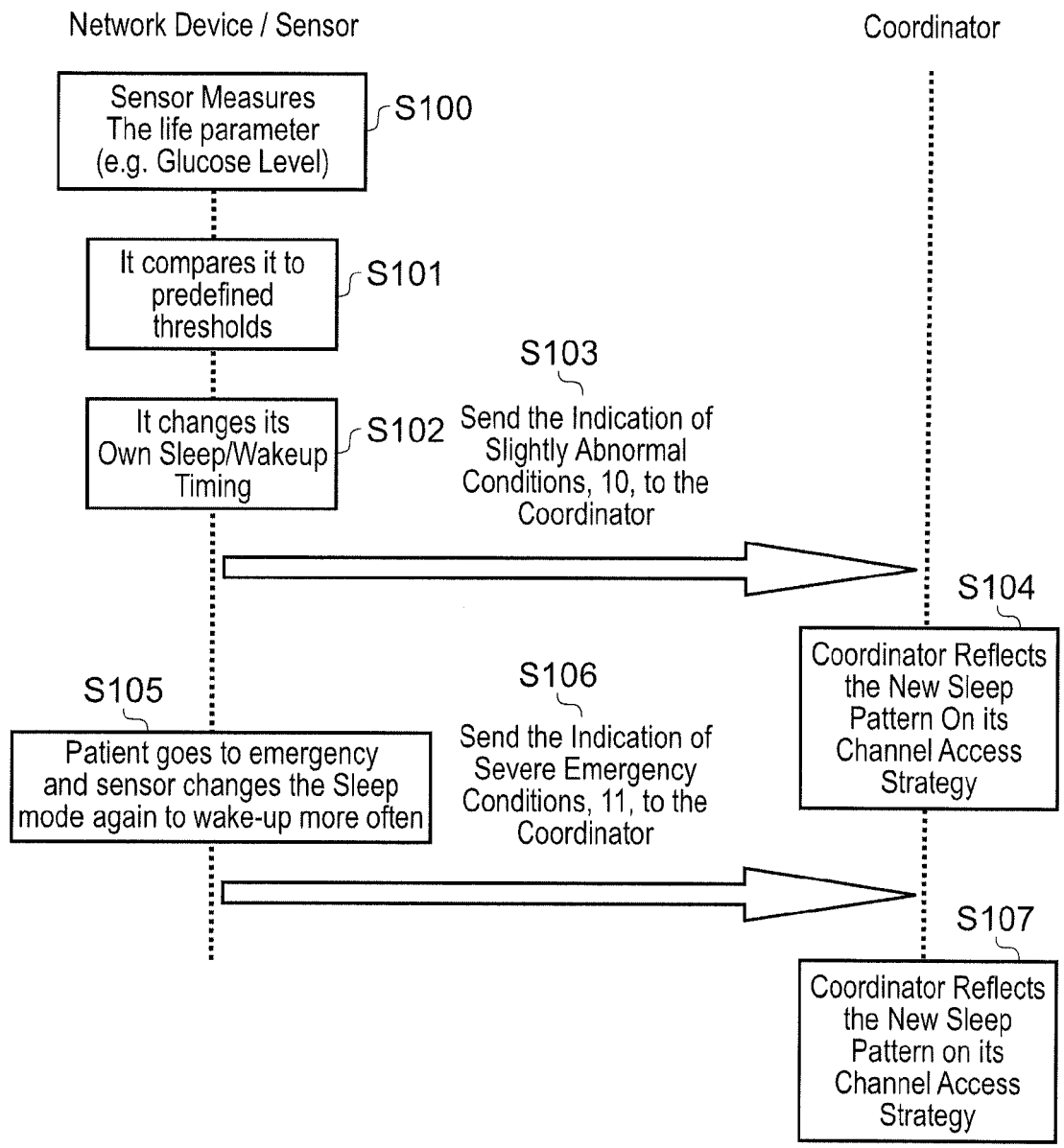
FIG. 14 is a flow diagram showing signal flow from a device to a co-ordinator with a changing parameter value.

FIG. 14 is a flow diagram which shows the signal flow from a device from a coordinator given an increasingly abnormal situation defined by the life parameter or other parameter measured. Initially the sensor measures S100 a life parameter such as glucose level and compares it S101 to predefined thresholds. In response to this comparison it changes its own sleep pattern S102 and sends S103 an indication of the result of the comparison (and thus of the sleep pattern) to the coordinator as urgency bits 10. Although the transmission is shown directly from the sensor to the coordinator in this and the following diagrams, the skilled reader will appreciate that in a peer-to-peer network, the transmission may be indirect, via other nodes. Once the coordinator receives the indication of the sleep pattern from the sensor, it can reflect this S104 in its channel access strategy and/or other resource management. Subsequently, the patient goes into an emergency condition S105 as defined by the comparison of glucose level to the thresholds. At this stage the sensor changes its sleep pattern to a higher frequency mode. It also sends S106 an indication of severe emergency conditions using bits 11 to the coordinator and the coordinator again reflects S107 the new sleep pattern in its resource management. Although resource management is mentioned specifically here, in difference circumstances different functions of the coordinator may be influenced. For example the coordinator may send a message to a sensor monitoring unit or to another device in the network as a result of a change in the sleep pattern.

Table 1 and FIG. 14 relate to a self sleep fine-tuning capability but do not consider the battery level of a device. In this embodiment, the sensor determines and the implements a suitable sleep pattern based on the parameter values alone. Hence, the medical situation is a predominant factor and the scenario is particularly suitable for intensive care situation when the medical assistant is present.

Figure 15:
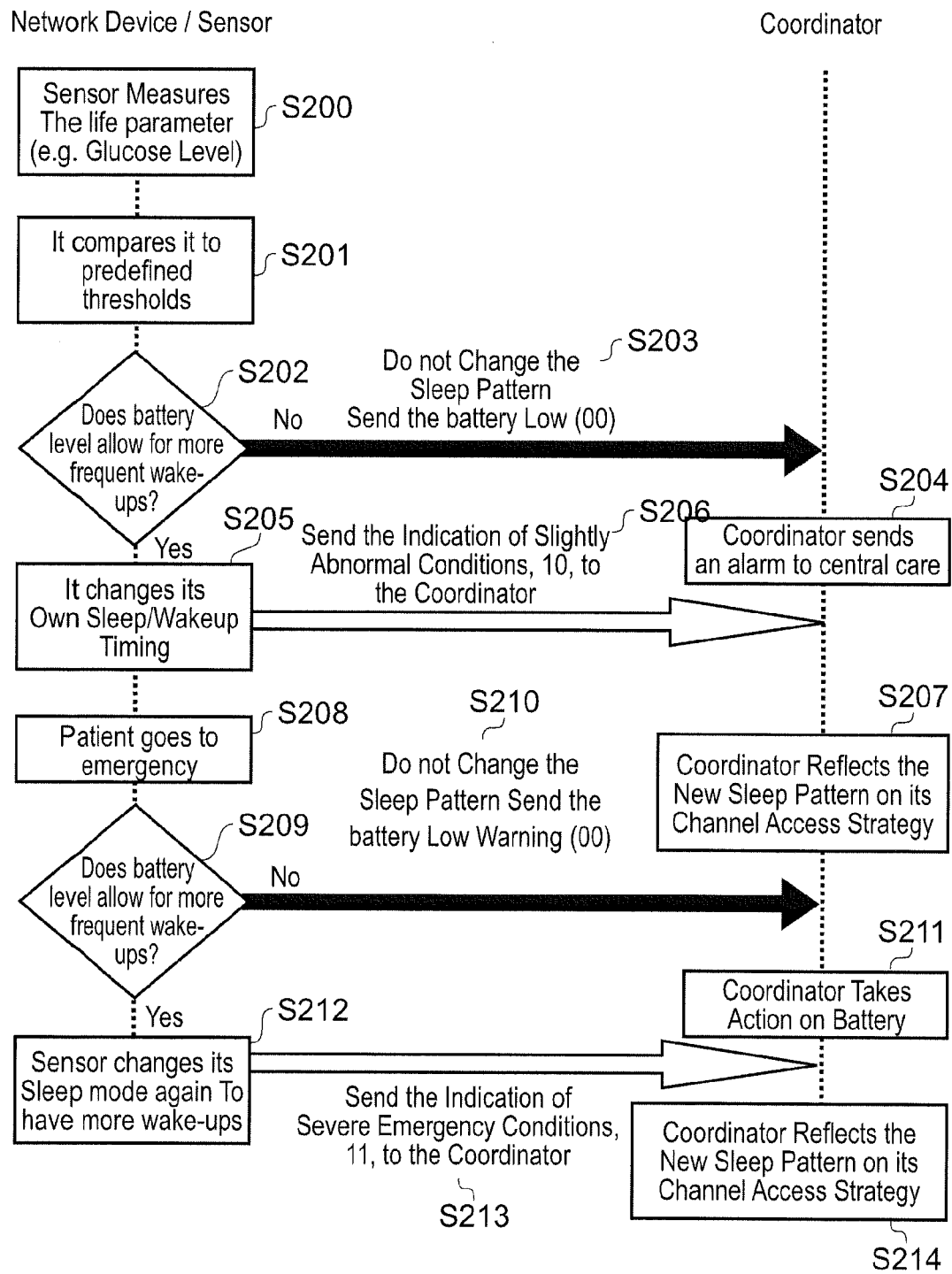
FIG. 15 is a flow diagram showing signal flow from a device to a coordinator with a changing parameter value and battery charge status.

In other embodiments, the sleep pattern can be modified autonomously by the sensor in dependence upon not only the parameter values but also a battery check. FIG. 15 is a flow diagram showing signal flow from a device to a coordinator with a changing parameter value and changing battery charge status. Such embodiments can be useful in medical telemetry applications in which urgent medical assistance may not be available.

In such cases the battery level can be included in the sleep pattern control to make sure that higher duty cycle sleep patterns do not lead to complete depletion of the battery charge. In these invention embodiments, a higher duty cycle pattern which is suitable given the parameter values measured can only be selected if the battery level is appropriate. Otherwise, the current sleep pattern is maintained. Equally, if the battery level falls, a lower duty-cycle than that suitable for the parameter values measured may need to be selected.

In this scenario, emergency data is still transmitted but at a slower pace than is ideal. This is particularly advantageous when the device is an implant, for example and the battery cannot be replaced immediately (because an operation is necessary to access the battery). It is also helpful for telemetry emergency applications when the nurse or medical assistants are not around during the night to change the batteries for non-implant applications. For example, in homecare it is advantageous to continue recording at the coordinator any rare medical or emergency situations which may occur for a couple of minutes only during the night with a higher accuracy and sampling rate. FIG. 15 shows a progression to a emergency status when a life parameter such as glucose level rises. Starting with a medical device in a normal situation, urgency bits 01 as set out in Table 1 may be transmitted in one or more current transmission frames. The parameter is measured S200 and compared to thresholds S201 as before. If the life parameter indicates a slightly abnormal condition in comparison to the predefined thresholds, the next step is to check S202 if the battery level allows for more frequent wake ups (a higher level duty cycle). If not, the sleep pattern is not changed S203 but a battery low signal is sent to the coordinator with battery bits 00, at which stage the coordinator can send S204 an alarm to central care. If the battery level does allow a change in the sleep pattern, the device changes its pattern S205 and sends S206 the new urgency bits in one or more transmission frames to the coordinator. At this stage the coordinator can reflect S207 the new sleep pattern in its channel access strategy and/or other functions. In the following phase, the patient goes into an emergency S208, defined by the life parameter crossing another threshold. At this stage the sensor again checks S209 if more frequent wake ups are permitted by the battery level. If not, a battery low warning is sent S210 to the coordinator with battery bits 00 and the coordinator can take action S211 on the battery, for example, to send an alarm or a signal to change the battery. If the battery level does allow for more frequent wake ups, the sensor can change S212 its sleep pattern again and send S213 an indication of severe emergency conditions to the coordinator using bits 11. The coordinator can then again reflect S214 the sleep pattern change in its functioning.

FIG. 16 is a table 70 demonstrating one way of associating sleep patterns to levels of battery charge. The percentage charge is divided into four different levels each with a range of 25%. Alternatively fewer or more levels may be chosen and the scale need not be divided linearly. For example, the top charge level may be of 50 to 100% for example and other charge levels may cover a smaller range. In FIG. 16, battery bits are shown. These are means of transmitting information about the current battery charge towards the coordinator. As for the urgency bits, two bits are used, allowing division of the battery charge into four different levels. Here the sleep patterns shown may be for a single category of device so that the division into medical and non-medical devices shown in the previous Figures and Table 1 is no longer applicable. The lowest level<1 (0 to 25%) only allows a low wake up sleep pattern whatever the outcome of the threshold comparison; the second level L2 additionally allows a medium wake up pattern; the third level L3 (50 to 75%) additionally allows a higher wake up pattern and the top level L4 (75 to 100%) additionally allows a continuous wake up pattern so that all the possible sleep patterns are permitted. Thus the battery charge level overrides a sleep pattern selected according to parameter values if necessary. There is a one-to-one correspondence between the limits between the levels L1 to L4 and the thresholds defined for the parameters, for reasons of practicality, so that each limit crossed between two levels moves the boundary for acceptable sleep patterns by one predefined sleep pattern.

Figure 17:
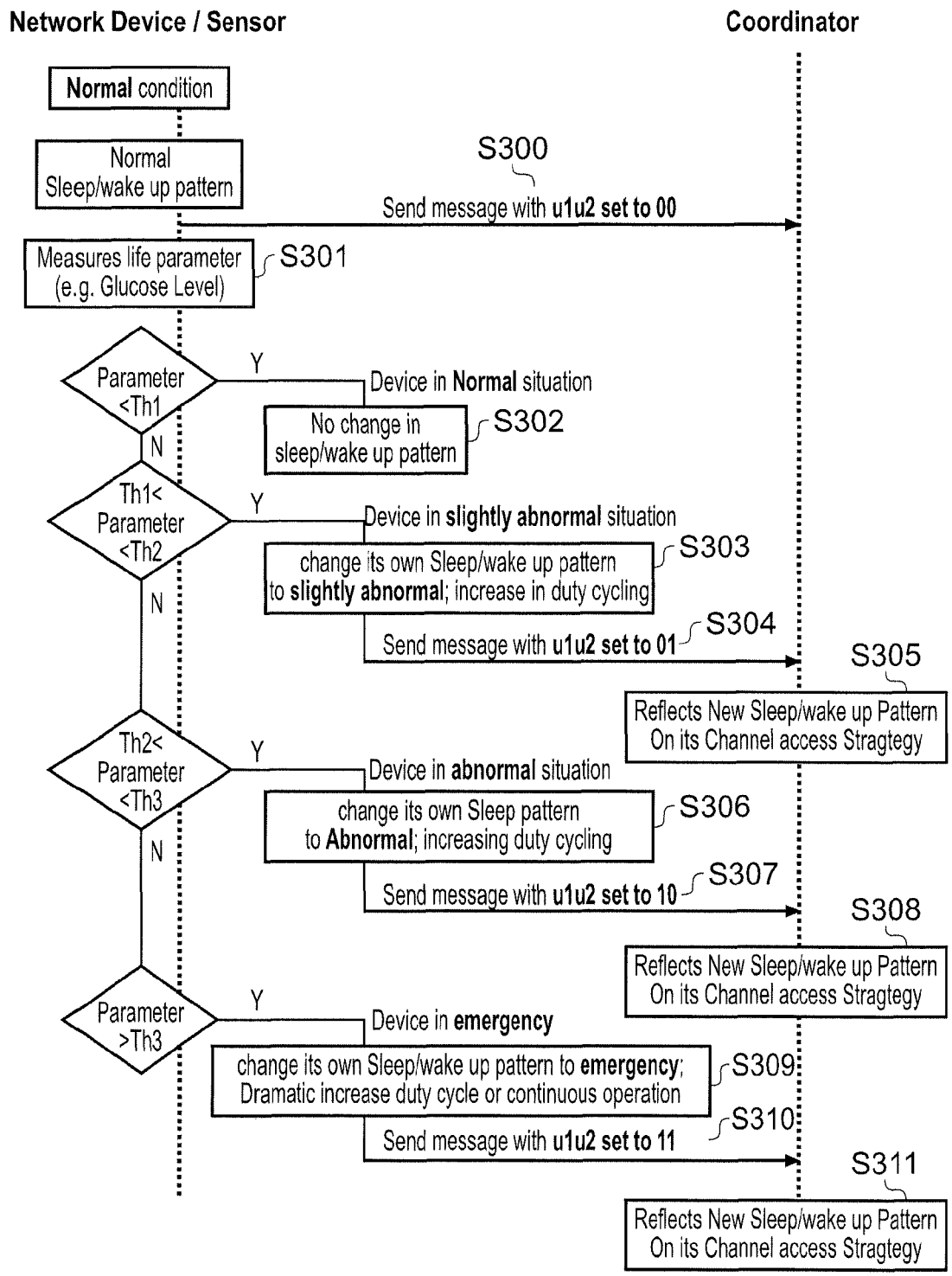
FIG. 17 is another flow diagram showing signal flow from a device to a co-ordinator with a changing parameter value.

FIG. 17 is a flow diagram showing another method in a device of selecting a sleep pattern without considering battery level. Here, as for FIG. 16, only one category of device is considered. The device sends frames with urgency bits which are set according to Table 2 shown below.

TABLE 2 sleep patterns and urgency bits in a network of devices of the same type

| Urgent bits: u1u2 | Urgency level | Upper threshold | Sleep/wake up pattern |
|---|---|---|---|
| 00 | Device in Normal Condition | Th1 | Normal sleep/wake up pattern; Longest Sleep Time, very low duty cycle |
| 01 | Device in Slightly Abnormal condition | Th2 | Slightly Abnormal Sleep/wake up Pattern; Slight increase of duty cycle |
| 10 | Device in Abnormal condition | Th3 | Abnormal Sleep/wake up Pattern; increase of duty cycle |
| 11 | Device in Emergency | | Emergency Sleep/wake up Pattern; dramatic increase of duty or cycle or continuous wake up |

In a normal condition the device sends urgency bits 00 (with parameter values up to threshold TH1). With a slight abnormality (from Th1 up to threshold TH2 of the measured parameter), urgency bits 01 are sent. In abnormal conditions up to threshold Th3 of the measured parameter the device sends urgency bits 10. From measured parameter values of Th3 upwards, the device is in emergency and sends urgency bits 11.

Assuming the sensor starts in a normal condition with a normal sleep pattern at the start of FIG. 17, the sleep pattern indication is sent S300 to the coordinator is a 00 message. The sensor then measures S301 the life parameter against the thresholds mentioned previously. If the device is in a normal situation, there is no change S302 in the sleep pattern. In a slightly abnormal situation defined between thresholds Th1 and Th2, the sensor undergoes an increase S303 in the duty cycle and an indication of the new sleep pattern is sent S304 to the coordinator as bits 01. The coordinator then responds accordingly, for example changing S305 its channel access strategy. If the parameter falls between the second and third thresholds Th2 and Th3 the device is in an abnormal situation and the sleep pattern is changed S306 again to the corresponding message sent S307 to the coordinator with urgency bits 10. The coordinator then again reflects S308 this in its resourcing. Finally, if the measured parameter is above parameter Th3, the device is in an emergency and changes S309 its duty cycle again to the highest level, sending S310 a message with urgency bits 11 to the coordinator, which again changes S311 its channel access strategy.

Figure 18A:
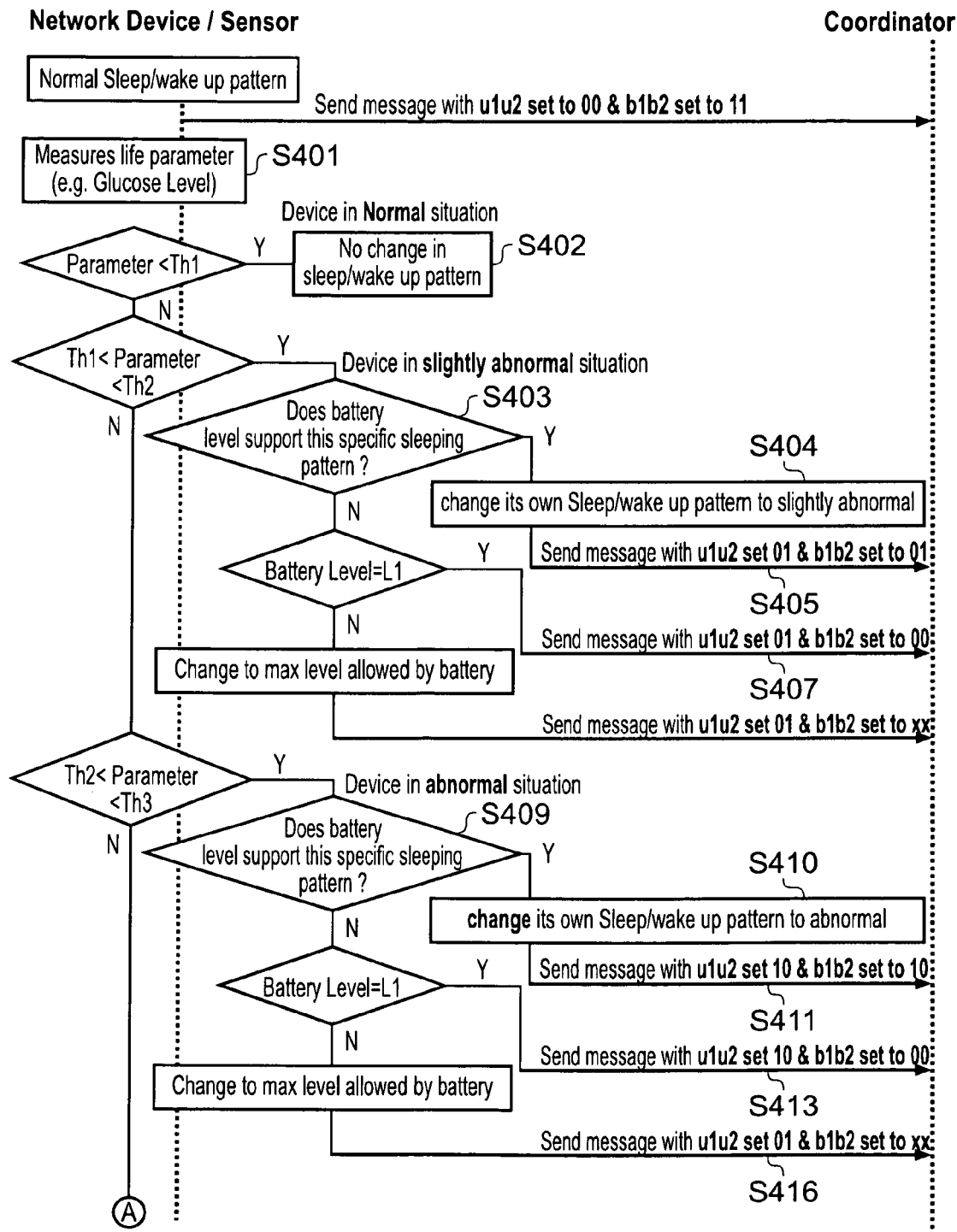
FIG. 18 is another flow diagram showing signal flow from a device to a coordinator with a changing parameter value and battery charge status.
Figure 18B:
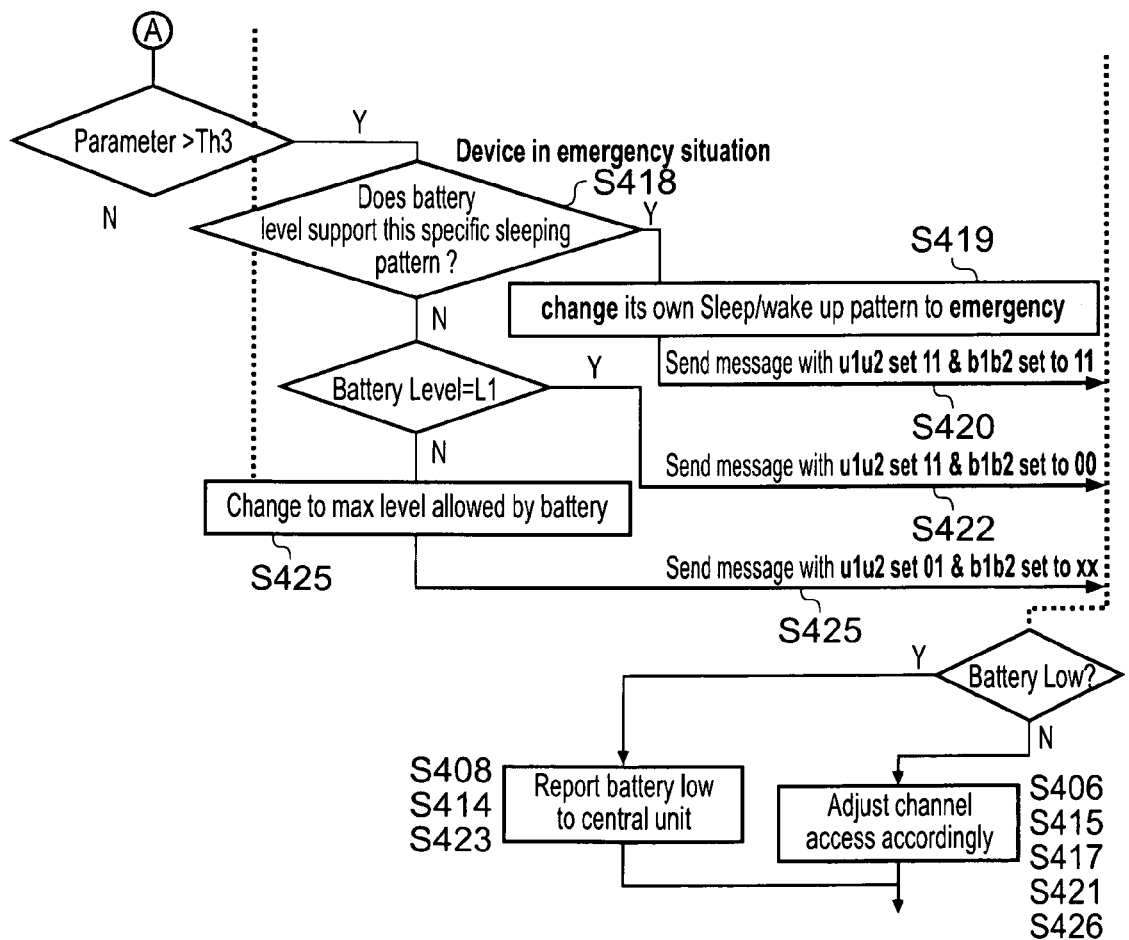

FIG. 18 is the corresponding flow diagram to FIG. 17 with the battery level now being taken into consideration. In this embodiment, battery bits and urgent bits are transmitted from the sensor. The urgency bits indicate a suitable sleep pattern taking the parameter measurement only into account and the battery bits show the actual sleep pattern in operation, which is the maximum allowed sleep pattern. At the end of the process for any parameter values above Th1, once battery and urgency bits have been transmitted, there may be a further battery level check based on the bits transmitted (at the coordinator). If the battery is low this is reported, if not channel access is adjusted. For ease of understanding, these steps are considered in conjunction with the steps for each parameter level. At the beginning of the procedure we assume that the sensor has a normal sleep-wake up pattern and a fully charged battery, and a corresponding message is sent S400 to the coordinator with the urgency bits sent to 00 and the battery bits sent to 11. The sensor then measures S401 the life parameter to see if it falls below Th1, between Th1 and Th2, between Th2 and Th3, or above Th3. If the parameter is below Th1 no change S402 in the sleep wake up pattern is required and no new message is required unless the battery level falls to a low state. This scenario is not considered in the flow diagram.

If the life parameter falls between the first and second threshold Th1 and Th2, the battery level is checked S403. If the sleep pattern selected by this parameter measurement is allowed by the control means in accordance with the table in FIG. 16 (that is, in this case, if the battery charge is at L2, L3 or L4) the sleep pattern is changed S404 to slightly abnormal, and a message is sent S404 to the coordinator with the urgency bits sent to 01 to reflect this and the battery bits set to 01. At the coordinator, channel access is adjusted accordingly. If the battery is at L1, there can be no change of sleep pattern but a message is sent to indicate the sleep pattern 01 which would be suitable taking the rise in the parameter into account (for a slightly abnormal situation) and the battery bits are set to 00 to reflect the actual sleep pattern given the battery level L1. The coordinator reports to the low battery. Otherwise the sleep pattern is changed to the maximum level allowed by the battery and the message is sent to the coordinator with the urgency bit set to 01 and the battery bits set to xx, which is the battery level for the maximum allowed sleep-wake up pattern. This step may be redundant here, because if the battery level is ok for a device in a slightly abnormal situation, this would cover levels L2, L3 and L4. Thus the only other alternative is that the battery level is L1. The step of asking if the battery level is L1 may nevertheless be included here, for ease of implementation in line with the other parameter levels, or it may be omitted.

If the parameter falls between Th2 and Th3 and the device is thus in an abnormal situation, then the battery level is again checked S409 to see if it is acceptable. If it is ok for the required sleep pattern change (that is at L3 or L4), the device changes S410 to an abnormal sleep pattern and sends S411 a message to the coordinator with the urgency bits sent to 10 and the battery bits set to 10. The channel access is adjusted S412. If on the other hand the battery level is at L1, no change to the sleep pattern is available and a message is sent S413 to the coordinator with the urgency bits reflecting the suitable sleep pattern 10 for the measured parameter, which is however not available. The battery bits are set to 00. Battery low is reported S414. Otherwise, (if the battery level is at L2) the sleep pattern is changed S415 to the maximum allowed by the battery (01) and the message is sent S416 with the urgency bits set to 10 and the battery bits set to xx which is the maximum allowed sleep pattern channel access is adjusted S417. The only possibility remaining here is level L2 (01) because the other levels are accounted for in the previous steps.

Finally, if the parameter falls above threshold Th3, then the battery level is checked S418. It is only ok if it is at level L4. In this case the device changes S419 its own sleep pattern to emergency sending S420 a message with the urgency bits set to 11 and the battery bits set to 11. Channel access is adjusted S421. On the other hand if the battery level is at L1, a message is sent with urgency bits set to 11 and the battery bits set to 00. Battery low is reported S423. For any other level (here levels L2 and L3) the sleep pattern is changed S424 to the maximum pattern allowed and urgency bits sent S425 are set to 11 and battery bits sent are set to xx, being the maximum allowed sleep pattern. Channel access is adjusted S426 as before.

Alternatively, the battery bits can be used separately from the parameter measurement, purely as an indicator of battery level and the urgency bits can be used to indicate the value of the parameter, and thus the sleep pattern suitable for the sensor without taking the battery level into account. The co-ordinator can then calculate the actual sleep pattern selected from the combination of these values. This alternative gives more detailed information about battery levels but requires increased processing capability at the co-ordinator.

The following description indicates how the above signalling protocols can be accommodated within a communication standard such as IEEE 802.15.6 which is currently under development based on IEEE 802.15.4. FIG. 19 illustrates a modification to the IEEE 802.15.4 frame format to indicate urgency of the message so that the urgent message is assigned high priority over others. Two urgency bits 81, 82 are shown and are employed by the sensor in transmission frames such as any or all of data frames, acknowledgement frames and MAC command frames to indicate the changing sleep pattern of the sensor to the coordinator.

These urgency bits can also be used to differentiate between non-medical and medical devices as shown for example in Table 1 or for differentiation of priority between different device types in an industrial application. As can be seen from the comparison with FIG. 10, the frame control is extended by one octet in which two bits (urgency U1 and urgency U2) are used to indicate different levels of urgencies which correspond to different sleep patterns.

FIG. 20 additionally includes two bits 83, 84 related to the battery level. The bits are shown as battery level 1, L1 and level 2, L2. As explained with relation to FIG. 18, in this case the urgency bits may not reflect the actual sleep pattern in operation but may instead show a suitable sleep pattern, even if it cannot be implemented because it is not allowed due to battery level considerations. Equally the battery bits may need to be viewed in conjunction with the urgency bits as an indication of the actual sleep pattern implemented taking the battery level into account.

The above embodiments could be incorporated as an enhancement to IEEE 802.15.4 or as an integral part of a new standard under development requiring the proposed features such as IEEE 802.15.6, the standard for BAN.

This sleep pattern enhancement may be one of a number of linked enhancements. FIG. 21 shows the required modifications to IEEE 802.15.4 frame control fields to include the urgency bits and battery bits referred to herein, along with an emergency bit and two bits denoting an acknowledgement type. For backward compatibility, the reserved bits (7-9) of IEEE 802.15.4 are used for these emergency and acknowledgement types. In addition, the frame control has been extended by one octet of which two bits are used to distinguish various levels of urgency and another two battery bits as explained hereinbefore. The remaining two bits of the octet are reserved. The IEEE 802.15.4 modified frame type is shown in FIG. 22. For backward compatibility, reserved bits 100-111 are used to indicate the different type of ACK frames and an emergency frame which is a new type of frame created for emergency situations.

Starting a standard from a "green field" approach, the enhancements would possibly include in the frame control the following:
Two bits for ACK types
Two bits for urgency levels
Two bits for battery levels
Three bits to indicate the type of frame
Moreover the frame type in the control frame could include values to indicate any of the following in addition to other type frames such as data frame, MAC frame and Beacon frame:
Emergency frame
ACK frame
Immediate ACK frame
Delayed ACK frame FIG. 23 illustrates the enhancements as part of a new standard such as IEEE 802.15.6. The Figure illustrates the proposed part of the header frame at the MAC layer. The skilled reader will appreciate that the urgency levels and battery levels refer to the embodiments of the present application, which may be combined with any combination of the other enhancements to form further embodiments in a complete system. In one embodiment, an emergency bit (or other emergency indication) used in conjunction with urgency bits and optionally battery level bits (suitable sleep pattern indication and optionally battery charge indication) can supplement and/or confirm emergency status. FIG. 24 shows a corresponding table of possible frame type bits.

FIG. 25 illustrates the basic format of a MAC frame in the current IEEE 802.15.4 standard indicating the location of the MAC Command octets. FIG. 26 illustrates the Command Frame Identifier list of the current version of IEEE 802.15.4 standard.

The frame control embodiments of the present invention described above use at least four bits (u1 u2 b1 b2) in the MAC frame control of the MAC frame header to specify the states of a BAN device. These state information bits can all be set independently and combined in multiple ways for BAN, BAN traffic, and BAN device management, generally in, but not limited to, emergency situations. They may be sent in a MAC command frame as shown in FIG. 25, or any other type of transmission frame.

In an alternative solution, a new MAC command frame can be added, with a new command frame identifier added to the list in FIG. 26. The payload could be used to differentiate between device states using the bits previously mentioned or in some other way.

A further alternative and preferable approach suitable for any transmission frame type indicating MAC command frames, is to introduce a single octet outside the frame control but still in the MAC Header with the bits previously mentioned preferably an enumerated list of device states as shown below. This octet will provide a total of 256 possible device states, for example, but not limited to:

State ID—Device State Description
0x01—Normal (i.e. no emergency, battery normal)
0x02—No emergency, battery medium
0x03—No emergency, battery low
0x04—Emergency, battery normal
0x05—Emergency, battery medium
0x06—Emergency, battery low In order for a receiving device to know whether or not to read and interpret this field, a single "Device State" (ds) bit can be introduced into the MAC Frame Control to indicate read and interpret device state (ds=1) or ignore device state (ds=0).

Invention embodiments can have the following advantageous aspects:
1. They can introduce a novel sensor circuit which is capable of changing its own sleep wake-up pattern in response to emergency
2. The wake-up radio circuitry can have an input directly from a life parameter such as blood pressure or glucose level or a critical industrial parameter.
3. A self-tuning sleep pattern is provided, taking battery status into account.
4. A novel protocol is introduced for self-tuning of a sleep/wake-up pattern informing the coordinator
5. Another novel protocol is introduced for self-tuning of a sleep/wake-up pattern in a sensor informing the coordinator and considering the battery status Embodiments of the present invention may have a vital role to play in facilitating emergency management by use of MBANs. The following scenarios may be noted:

1. Hundreds of millions of people worldwide suffer from diabetics. Implantable or non-invasive methods for glucose measurement have been considered recently. The WSN will help to provide patient's glucose level information on a 24 hours basis. There are situations where the patient glucose is off the chart and emergency geolocation and other necessary urgent medical procedures for the patients are required. The situation with hundreds of millions of patients worldwide with cardiac and heart problems can be monitored in hospital or at home by employing wireless sensors and MBAN on their bodies. The MBAN provide extra mobility for such patients. For this group of patients under situations such as abnormal heart functioning or more severe cases such as heart attack it is vital to make sure that no vital medical data is missed or delayed during life threatening medical emergencies. Invention embodiments create the potential for a sensor to self tune its sleep/wake-up pattern in response to emergency conditions. This will make sure that more accurate and up-to-date data will be available during an emergency having a life-saving impact during emergency medical operations.
2. Invention embodiments can save lives of thousand of patients who may go under emergency conditions when medical staff are not around.
3. Invention embodiments can improve the efficiency of emergency response in a medical system
4. Invention embodiments can improve the emergency awareness in a medical MBAN system.
5. Invention embodiments can reduce the labor costs by automating the emergency response process
6. Improve the accuracy of emergency data fetched from patient body.
7. By harmonizing the sensor and coordinator invention embodiments make it possible to achieve the best sleep pattern considering a current battery level.

The present invention may take the form of a novel sensor, coordinator, or hardware modules for the same, and can be implemented by replacing or modifying software executed by processors of the sensor(s) and/or the coordinator.

Thus, embodiments of the present invention may be implemented in hardware, or as software modules running on one or more processors, or on a combination thereof. The invention may also be embodied as one or more device or apparatus programs (e.g. computer programs and computer program products) for carrying out part or all of any of the techniques described herein. Such programs embodying the present invention may be stored on computer-readable media, or could, for example, be in the form of one or more signals. Such signals may be data signals downloadable from an Internet website, or provided on a carrier signal, or in any other form.

Although the above description has referred to IEEE 802.15.4 and IEEE 802.15.6 by way of example, the invention may be applied to any type of MBAN whether or not operating in accordance with IEEE 802.15.6, as well as to other types of BAN and other short-range WSNs which even if not medical body area networks nevertheless have a requirement for improved reliability of communication in emergency situations.

The invention claimed is:

1. A sensor for use in a wireless sensor network of devices, comprising:
sensing means operable to detect values of a parameter;
control means operable to determine a suitable sleep pattern of the sensor by comparing the detected values with thresholds and
a transmitter operable to transmit an indication of the sleep pattern to a further device in the wireless sensor network; wherein there is a number of predefined sleep patterns determined by the number of thresholds, each threshold defining a boundary between a lower wake-up and a higher wake-up sleep pattern; and wherein the sensor further comprises a battery, the control means being operable to control the sleep pattern taking into account both the detected values and a current battery charge of the sensor by allowing or rejecting suitable sleep patterns according to predefined limits of acceptable battery charge and overriding any rejected suitable sleep pattern with a lower wake-up sleep pattern, the number of limits being equal to the number of thresholds and the control means allowing one fewer sleep pattern below each limit than above it.

2. The sensor according to claim 1, wherein the indication is transmitted in at least one control field of a transmission frame.

3. The sensor according to claim 1 wherein transmission of the indication takes priority over other transmissions from the sensor.

4. The sensor according to claim 1, wherein the sensor further comprises a receiver operable to receive an acknowledgement of the indication.

5. The sensor according to claim 1, further comprising, memory and processing means operable to compare the detected values against a stored threshold; wherein
the control means are operable to determine the suitable sleep pattern of the sensor taking into account a result of the comparison.

6. The sensor according to claim 5, wherein there is more than one stored threshold.

7. The sensor according to claim 1, wherein the transmitter is additionally operable to transmit information relating to the current battery charge, in the form of an indication of the actual sleep pattern selected by the control means.

8. A wireless sensor network of devices including a sensor and a coordinator:
the sensor comprising sensing means operable to detect values of a parameter; transmission and reception means; and sensor control means operable to control the sleep pattern of the sensor; and
the coordinator comprising transmission and reception means; wherein
the sensor is operable to determine the sensor's more suitable sleep pattern by comparing the detected parameter values with thresholds, wherein there is a number of predefined sleep patterns determined by the number of thresholds, each threshold defining a boundary between a lower wake-up and a higher wake-up sleep pattern; and
the sensor is also operable to influence coordinator operation by transmission of an indication of its sleep pattern; wherein
the sensor further comprises a battery, the control means being operable to control the sleep pattern taking into account both the detected values and a current battery charge of the sensor by allowing or rejecting sleep patterns according to predefined limits of acceptable battery charge and overriding any rejected sleep pattern with a lower wake-up sleep pattern; the number of limits being equal to the number of thresholds and the control means allowing one fewer sleep pattern below each limit than above it.

9. A coordinator in a wireless sensor network of devices including sensors and the coordinator, wherein the coordinator comprises
transmission and reception means for communication with the sensors; and
coordinator control means operable to influence functioning of the coordinator in response to an indication of a sleep pattern transmitted by a particular one of the sensors; the particular sensor determining a sleep pattern by comparing detected values with thresholds, the number of sleep patterns being determined by the number of thresholds, each threshold defining a boundary between a lower wake-up and a higher wake-up sleep pattern;
the sensor allowing or rejecting sleep patterns according to predefined limits of acceptable battery charge and overriding any rejected sleep pattern with a lower wake-up sleep pattern, the number of limits being equal to the number of thresholds and the control means allowing one fewer sleep pattern below each limit than above it; wherein
the coordinator control means are operable to influence functioning of the coordinator taking into account the indication as information about a current battery charge level of the particular sensor.

10. The coordinator according to claim 9, wherein the coordinator is operable to reflect the information about the correct battery level in the coordinator's channel access strategy.

* * * * *

UNITED STATES PATENT AND TRADEMARK OFFICE
CERTIFICATE OF CORRECTION

PATENT NO. : 8,825,120 B2
APPLICATION NO. : 13/254068
DATED : September 2, 2014
INVENTOR(S) : Hind Chebbo et al.

It is certified that error appears in the above-identified patent and that said Letters Patent is hereby corrected as shown below:

On the Title Page, Item [54] and in the Specification, Column 1, Line 1, (Title), Delete "SHORT RANGE" and insert -- SHORT-RANGE --, therefor.

On the Title Page, Column 2, Line 4, Item [56] (Other Publications), Delete "IEEE 802.15/09/0040 00/0006," and insert -- IEEE 802.15-09-0040-00-0006," --, therefor.

In the Claims

Column 20, Line 13, In Claim 8, Delete "pattern;" and insert -- pattern, --, therefor.

Signed and Sealed this
Twenty-third Day of December, 2014

Michelle K. Lee
*Deputy Director of the United States Patent and Trademark Office*